(12) United States Patent
Hammad et al.

(10) Patent No.: US 10,163,109 B2
(45) Date of Patent: Dec. 25, 2018

(54) CONTACT ALERT SYSTEM AND METHOD

(71) Applicant: Visa International Service Association, San Francisco, CA (US)

(72) Inventors: Ayman Hammad, Pleasanton, CA (US); Mark Carlson, Half Moon Bay, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/463,733

(22) Filed: Mar. 20, 2017

(65) Prior Publication Data

US 2017/0255944 A1 Sep. 7, 2017

Related U.S. Application Data

(63) Continuation of application No. 12/759,449, filed on Apr. 13, 2010.

(60) Provisional application No. 61/237,804, filed on Aug. 28, 2009.

(51) Int. Cl.
*G06Q 20/42* (2012.01)
*G06Q 30/06* (2012.01)
*G06Q 40/00* (2012.01)
*H04W 4/12* (2009.01)

(52) U.S. Cl.
CPC ........... *G06Q 20/42* (2013.01); *G06Q 20/425* (2013.01); *G06Q 30/06* (2013.01); *G06Q 40/12* (2013.12); *H04W 4/12* (2013.01)

(58) Field of Classification Search
None
See application file for complete search history.

(56) References Cited

U.S. PATENT DOCUMENTS

| | | | |
|---|---|---|---|
| 5,530,438 | A | 6/1996 | Bickham |
| 5,615,110 | A | 3/1997 | Wong |
| 5,708,422 | A | 1/1998 | Blonder |
| 6,064,990 | A | 5/2000 | Goldsmith |
| 6,330,550 | B1 | 12/2001 | Brisebois |
| 6,529,725 | B1 | 3/2003 | Joao |
| 6,535,855 | B1 | 3/2003 | Cahill |
| 6,891,911 | B2 | 5/2005 | Rostoker |
| 7,096,003 | B2 | 8/2006 | Joao |
| 7,343,149 | B2 | 3/2008 | Benco |

(Continued)

FOREIGN PATENT DOCUMENTS

KR 10-2002-0021515 3/2002

OTHER PUBLICATIONS

The International Search Report for Application No. PCT/US2010/045785, dated Mar. 31, 2011, 5 pages.

(Continued)

*Primary Examiner* — Scott A Zare
(74) *Attorney, Agent, or Firm* — Kilpatrick, Townsend & Stockton LLP

(57) ABSTRACT

Embodiments of the present invention are directed to a system and method for receiving transaction data for a transaction, accessing a database comprising alert preference data, generating a contact alert message using the transaction data and alert preference data using a notification server coupled to the database wherein the contact alert message comprises contact information of a first person who conducted the transaction, and sending the contact alert message to a notification device of a second person.

16 Claims, 7 Drawing Sheets

(56) References Cited

U.S. PATENT DOCUMENTS

| | | | |
|---|---|---|---|
| 7,355,990 B2 | 4/2008 | Smith | |
| 7,357,310 B2 | 4/2008 | Calabrese | |
| 8,024,271 B2 | 9/2011 | Grant | |
| 8,190,132 B2 | 5/2012 | Pantorp | |
| 2002/0133462 A1 | 9/2002 | Yevgeniy | |
| 2003/0135456 A1 | 7/2003 | Murphy et al. | |
| 2004/0039683 A1 | 2/2004 | McGeorge | |
| 2006/0277142 A1 | 12/2006 | McGeorge | |
| 2007/0078760 A1 | 4/2007 | Conaty et al. | |
| 2007/0121800 A1 | 5/2007 | Rodkey et al. | |
| 2008/0010203 A1 | 1/2008 | Grant | |
| 2008/0154760 A1 | 6/2008 | Calabrese | |
| 2008/0167017 A1 | 7/2008 | Wentker et al. | |
| 2008/0167990 A1 | 7/2008 | Grant | |
| 2008/0183480 A1 | 7/2008 | Carlson et al. | |
| 2008/0200144 A1 | 8/2008 | Ginsberg | |
| 2008/0242322 A1 | 10/2008 | Scott et al. | |
| 2008/0288384 A1 | 11/2008 | Collins et al. | |
| 2009/0170531 A1 | 7/2009 | Hampel | |
| 2010/0138338 A1 | 6/2010 | Hammad | |
| 2010/0272114 A1 | 10/2010 | Carlson | |
| 2010/0274572 A1 | 10/2010 | Hammad | |
| 2010/0274679 A1 | 10/2010 | Hammad | |
| 2010/0274688 A1 | 10/2010 | Hammad | |
| 2010/0274689 A1 | 10/2010 | Hammad | |
| 2010/0274691 A1 | 10/2010 | Hammad | |
| 2010/0274866 A1 | 10/2010 | Hammad | |
| 2010/0287250 A1 | 11/2010 | Carlson | |
| 2010/0299208 A1 | 11/2010 | Carlson | |
| 2010/0299249 A1 | 11/2010 | Carlson | |
| 2010/0312700 A1 | 12/2010 | Coulter et al. | |
| 2011/0055013 A1 | 3/2011 | Hammad | |
| 2011/0055058 A1 | 3/2011 | Hammad | |
| 2011/0055076 A1 | 3/2011 | Trifiletti | |
| 2011/0066505 A1 | 3/2011 | Hammad | |
| 2011/0145082 A1 | 6/2011 | Hammad | |
| 2011/0145148 A1 | 6/2011 | Hammad | |
| 2012/0084164 A1 | 4/2012 | Hammad | |

OTHER PUBLICATIONS

The Written Opinion for Application No. PCT/US2010/045785, dated Mar. 31, 2011, 4 pages.
Non-Final Office Action dated Oct. 15, 2012 for U.S. Appl. No. 12/759,449, 9 pages.
Final Office Action dated Mar. 15, 2013 for U.S. Appl. No. 12/759,449, 12 pages.
Non-Final Office Action dated Oct. 9, 2013 for U.S. Appl. No. 12/759,449, 11 pages.
Final Office Action dated Mar. 26, 2014 for U.S. Appl. No. 12/759,449, 16 pages.
Australian Office Action dated Aug. 12, 2014 for AU Patent Application No. 2010292829, 3 pages.
Australian Notice of Acceptance dated Mar. 2, 2015 for AU Patent Application No. 2010292829, 3 pages.

CONTACT ALERT SYSTEM AND METHOD

CROSS-REFERENCES TO RELATED APPLICATIONS

This application is a continuation application of and claims priority to application Ser. No. 12/759,449 entitled "Contact Alert System and Method", filed Apr. 10, 2010, which The present application claims the benefit under 35 U.S.C. § 119(e) of and is a non-provisional of U.S. Provisional Patent Application No. 61/237,804, entitled "Contact Alert System and Method," filed on Aug. 28, 2009, the entire disclosure of which are incorporated herein by reference for all purposes.

BACKGROUND

Transaction alert messages are used to notify consumers that transactions have been conducted with their payment cards. For example, a user may receive an alert message regarding a recent transaction conducted at a gas station or with an online merchant. The alert message may contain transaction data such as the amount of the transaction, the time the transaction occurred, and the name of the merchant. The alert message may be sent to the user's mobile phone so that the consumer is notified that a transaction occurred.

Such alert messages could be improved so that they allow different persons associated with a payment account to quickly and easily communicate with each other.

Embodiments of the present invention address these problems and other problems individually and collectively.

BRIEF SUMMARY

Embodiments of the present invention disclosed herein include systems and methods for sending contact alert messages. The alert system can be implemented using one or more computer apparatuses and databases.

One embodiment of the invention is directed to a method comprising receiving transaction data for a transaction, accessing a database comprising alert preference data, generating a contact alert message using the transaction data and the alert preference data using a notification server computer wherein the contact alert message comprises contact information of a first person conducting the transaction, and sending the contact alert message to a notification device used by a second person.

Another embodiment of the invention is directed to a contact alert system comprising a database and a notification server computer coupled to the database. The database stores alert preference data. The notification server computer comprises a processor and a computer-readable medium coupled to the processor. The computer-readable medium comprises code executable by the processor for implementing a method comprising: receiving transaction data for a transaction; accessing the database comprising the alert preference data, generating a contact alert message using the transaction data and alert preference data using the notification server computer wherein the contact alert message comprises contact information of a first person conducting the transaction, and sending the contact alert message to a notification device used by a second person.

Another embodiment of the invention is directed to a method comprising: receiving a contact alert message at a notification device used by a second person after a first person conducts a transaction using a portable consumer device, wherein the contact alert message was generated by a notification server computer coupled to a database using transaction data and alert preference data stored in the database. The contact alert message comprises contact information for the first person. The method further comprises contacting the first person by the second person using the notification device that received the contact alert message.

These and other embodiments of the invention are described in further detail below.

DETAILED DESCRIPTION

One embodiment of the invention is directed to a method for sending a contact alert message to a notification device operated by a second person regarding a transaction along with contact information of a first person that conducted a transaction using a payment card (or other type of portable consumer device). The contact information in the alert message may be in the form of an e-mail address, a phone number, etc. The contact information in the alert message can be selectable, so that the notification device that receives the contact information can be used to readily contact the first person via the first person's notification device.

Illustratively, a first person such as a teenage son in a household may purchase an item at a merchant using a payment card, and a general transaction alert message may be sent to the son's mobile phone. The general transaction alert message may contain transaction data including the amount of the transaction, the merchant's name, and an identifier for the payment card. In addition to the general transaction alert message, a contact alert message may be sent to a mobile phone operated by the son's father (i.e., the second person). In addition to the transaction data, the contact alert message may also contain the phone number associated with the son's mobile phone. The phone number is in the form of an active link that can automatically dial the mobile phone number of the son's mobile phone when the active link is selected (e.g., touched). When the son conducts the transaction, the father is notified as to what the son is purchasing substantially contemporaneously (e.g., within 5 or 1 minute or less) with the son's purchase. If the father wants to contact the son, the father can simply touch the phone number in the contact alert message.

The second person may want to contact the first person for a variety of reasons. In the example above, the father may want to contact the son to ask the son why he is conducting the transaction. The father may alternatively want to ask his son to purchase another item at that same merchant, or at another merchant nearby.

I. Systems

Figure 1:
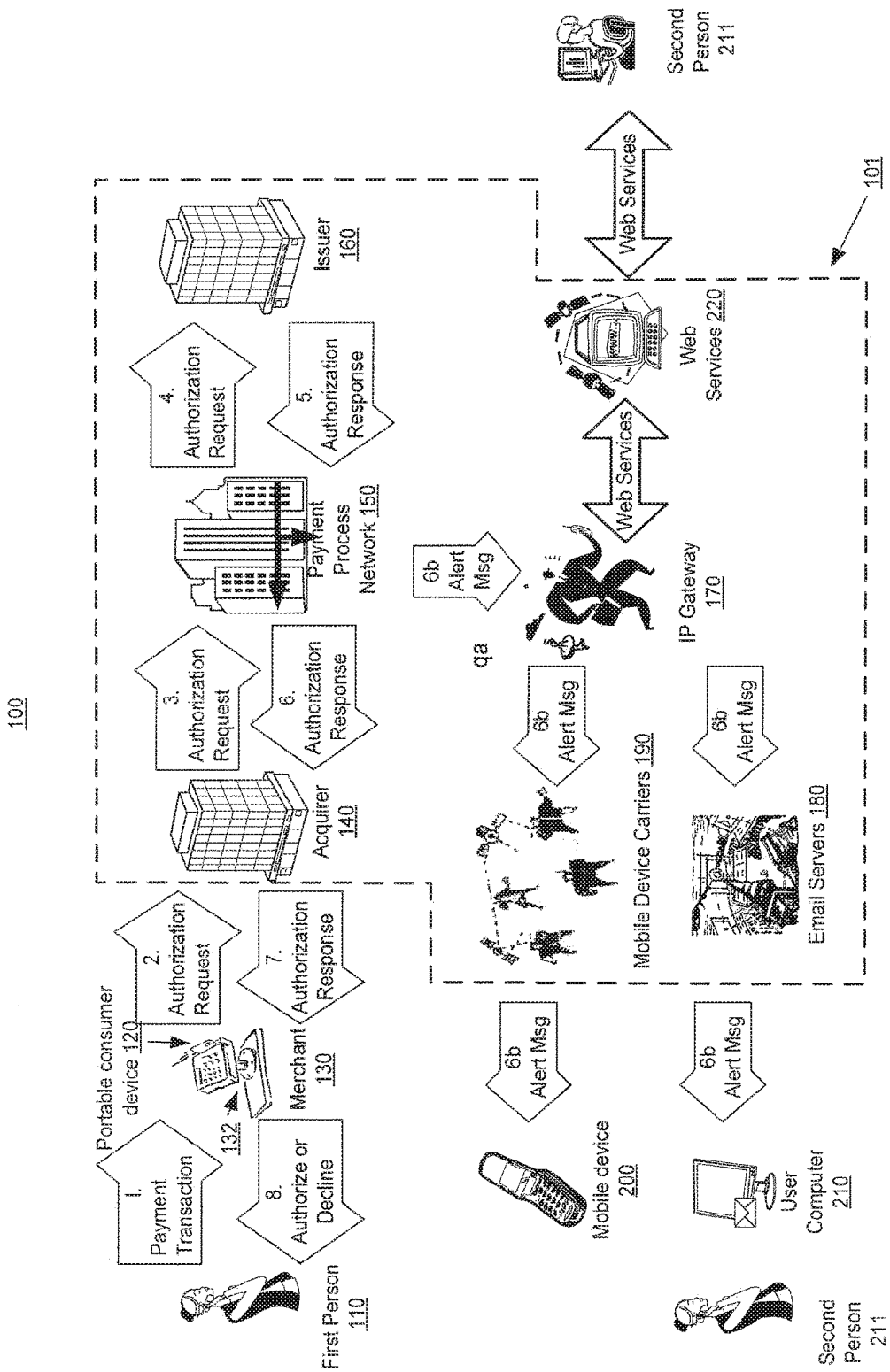
FIG. 1 shows a diagram of a alert system.

FIG. 1 is a diagram illustrating an alert system 100, in accordance with an embodiment of the invention. The alert system 100 includes a first person 110, a second person 211, a portable consumer device 120, a merchant 130, an access device 132, an acquirer 140, a payment processing network 150, an issuer 160, an IP gateway 170, mobile device carriers 190, e-mail servers 180, a mobile device 200, a user computer 210, and Web services 220. The mobile device 200 and the user computer 210 are examples of notifications devices. Further descriptions of notification devices and portable consumer devices are provided below.

First person 110 uses the portable consumer device 120 to conduct a transaction, and may further operate a mobile device 200 such as a mobile phone. The mobile device 200 operated by the first person 110 may receive a general transaction alert message after the first person 110 conducts a transaction using his portable consumer device 120.

Merchant 130 has an access device 132 for interacting with the portable consumer device 120 and the acquirer 140 is associated with the merchant 130. Acquirer 140 is in communication with issuer 160 through payment processing network 150.

The alert system 100 also includes an IP gateway 170 that is in communication with payment processing network 150. IP gateway 170 receives the transaction data from the payment processing network 150 and generates transaction alert messages. IP gateway 170 is also in communication with the mobile device carriers 190, e-mail servers 180, and Web services 220. The mobile device carriers 190 are in operative communication with the mobile device 200, and the mail servers 180 are in operative communication with the user computer 210. The transaction alert messages that are generated from IP gateway 170 are sent to the mobile device carriers 190 and/or mail servers 180 to be sent to the mobile device 200, and/or the user computer 210.

Web services 220 is also in operative communication with the second person 211 for enrolling the second person 211 and the first person 110 in the messaging service provided by the alert system 100. Web services 220 may also be in communication with a merchant 130 for enrolling merchant 130 in the messaging service provided by the alert system 100.

The first person 110 and the second person 211 may each be an individual or organization such as a business that is capable of purchasing goods or services or conducting any suitable transaction with the merchant 130.

Merchant 130 may refer to any suitable entity or entities that can conduct a transaction with first person 110 and/or the second person 211. Merchant 130 may have a physical location which sells goods and services to the first person 110 or the second person 211. For example, merchant 130 may use an e-commerce business to allow the transaction to be conducted by merchant 130 through the Internet. Other examples of merchant 130 include a department store, a gas station, a drug store, a grocery store, or other suitable business.

Access device 132 may be any suitable device for communicating with merchant 130 and for interacting with portable consumer device 120. Access device 132 can be in any suitable location such as at the same location as merchant 130. Access device 132 may be in any suitable form. Some examples of access devices 132 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. Access device 132 may use any suitable contact or contactless mode of operation to send or receive data from portable consumer devices 120.

If access device 132 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with portable consumer device 120.

Acquirer 140 refers to any suitable entity that has an account with merchant 130. In some embodiments, issuer 160 may also be acquirer 140.

Payment processing network 150 refers to a network of suitable entities that have information related to an account associated with portable consumer device 120. This information includes data associated with the account on portable consumer device 120 such as profile information, data, and other suitable information.

Payment processing network 150 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

Payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 150 may use any suitable wired or wireless network, including the Internet.

Issuer 160 refers to any suitable entity that may open and maintain an account associated with portable consumer device 120 used by first person 110 and/or the second person 211. Some examples of issuers may be a bank, a business entity such as a retail store, or a governmental entity.

IP gateway 170 refers to an entity that generates and delivers notifications and contact alert messages to various delivery channels. IP gateway 170 may include one or more servers and databases for generation of the contact alert messages and retrieval of data. IP gateway 170 may be part of the payment processing network 150 or may be a separate entity in communication with payment processing network 150.

E-mail servers 180 are server computers configured to receive an e-mail from a network connection and store the e-mail in memory for future retrieval.

Mobile device carriers 190 refer to entities that provide wireless infrastructures for wireless data transfer and communication via cellular phone or other mobile devices. Example of such entities are AT&T™, Verizon Wireless™, T-Mobile™, etc.

Mobile device 200 may be in any suitable form. For example, suitable mobile device 200 can be hand-held and compact so that they can fit into a consumer's wallet and/or pocket (e.g., pocket-sized). Some examples of mobile device 200 include desktop or laptop computers, cellular phones, personal digital assistants (PDAs), pagers, payment cards, security cards, access cards, smart media, transponders, and the like. In some embodiments, mobile device 200 and portable consumer device 120 are embodied in the same device. In some embodiments, the mobile device 200 (or other notification device) may comprise a processor, and a computer readable medium coupled to the processor. The computer readable medium comprises code, executable by the processor, for implementing a method comprising: receiving a contact alert message at a notification device used by a second person after a first person conducts a transaction using a portable consumer device, wherein the contact alert message was generated by a notification server computer coupled to a database using transaction data and alert preference data stored in the database, wherein the contact alert message comprises contact information for the first person; and contacting the first person by the second person using the notification device that received the contact alert message.

User computer 210 may be a personal computer or a laptop. The User computer 210 may run an operating system such as Microsoft Windows™ and may have a suitable browser such as Internet Explorer™.

Web services 220 may be in the form of a server and a Website which allows users and merchants to enroll in the messaging service. Web services 220 may be provided by the issuer 160 or the payment processing network 150.

Figure 2:
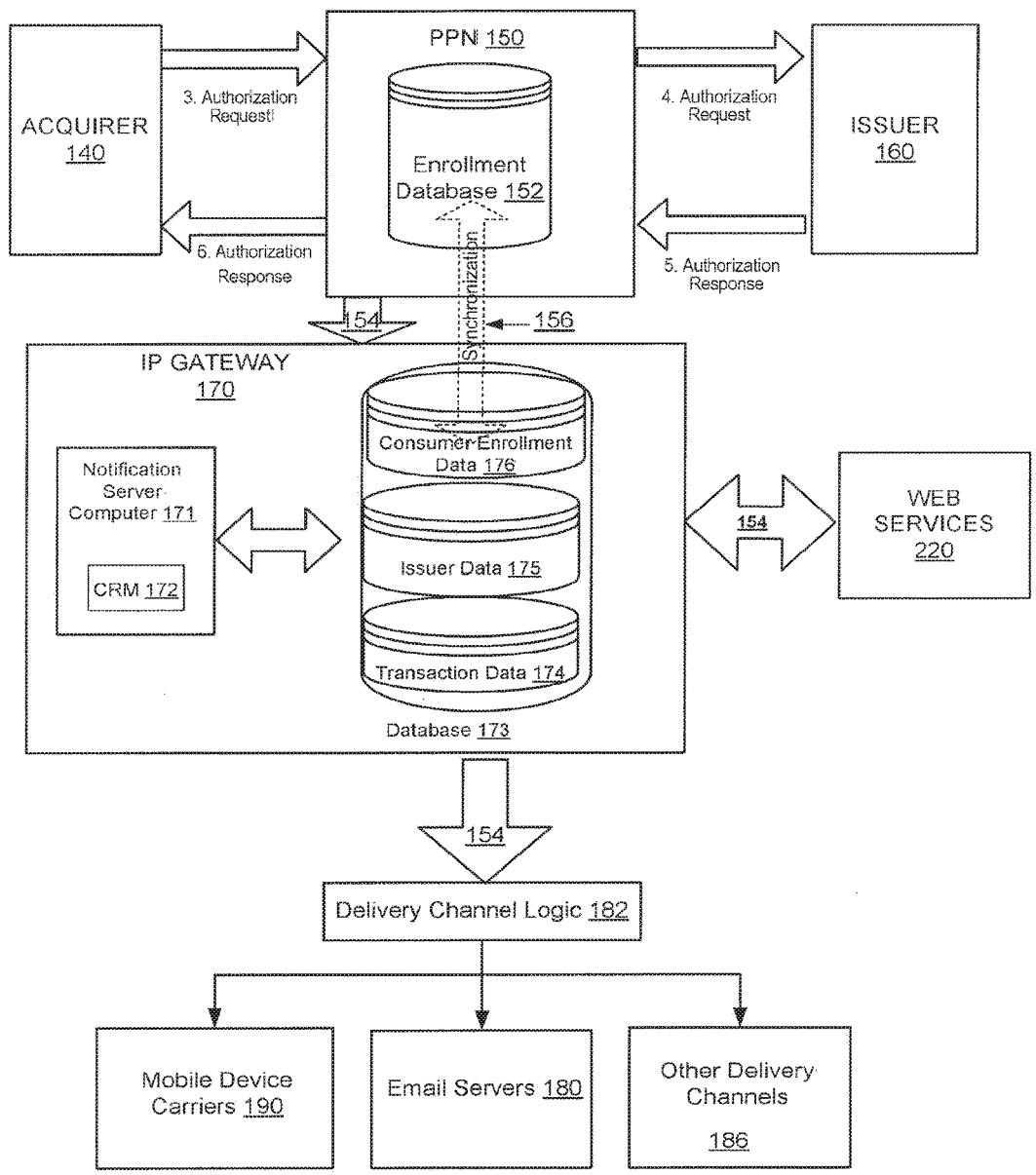
FIG. 2 shows a portion of the alert system in FIG. 1.

FIG. 2 is a diagram illustrating a subsystem 101 of the alert system 100. FIG. 2 illustrates more details about the IP gateway 170. The IP gateway 170 includes a notification server computer 171. The notification server computer comprises a processor and a computer-readable medium 172 coupled to the processor (not shown). The computer readable medium comprises code executable by the processor for implementing a method comprising: receiving transaction data for a transaction; accessing the database comprising alert preference data; generating a contact alert message using the transaction data and alert preference data using the notification server computer wherein the contact alert message comprises contact information of a first person conducting the transaction; and sending the contact alert message to a notification device used by a second person.

The notification server computer 171 is in communication with a database 173. In some embodiments, database 173 may be included in the notification server computer 171. Database 173 contains transaction data 174, issuer data 175, and consumer enrollment data 176 (which may include alert preference data). Consumer enrollment data 176 are synchronized with the enrollment database 152 in the payment processing network 150 via the synchronization link 156. The enrollment database 152 contains data related to persons who are enrolled in the messaging service. As shown in FIG. 2, IP gateway 170 is in communication with payment processing network 150, and Web services 220 via the network connection 154 which may be in any suitable form. The network connection 154 may include, for example, at least a portion of the Internet. Delivery channel logic 182 is in communication with IP gateway 170, mobile service carriers 190, e-mail servers 180, and other delivery channels 186.

II. Methods

A. Enrollment

In order to receive the contact alert messages associated with a transaction, a second person 211 enrolls in the messaging service provided by the alert system 100.

There may be multiple ways in which second person 211 may become enrolled in the messaging service. In some embodiments, second person 211 may be enrolled automatically by the issuer 160 that issues the portable consumer device 120. Enrollment for a consumer such as the second person 211 may also be done in a batch mode, by file delivery from issuer 160 or by file delivery from some other party. In other embodiments, issuer 160 or payment processing network 150 may provide the messaging service as an option to second person 211 at which time second person 211 may enroll in the messaging service either by contacting a customer service representative over the phone (provided either by issuer 160 or payment processing network 150), or by accessing a Web site and filling out an online application.

During the enrollment process either by accessing a Web site and filling an online application or by contacting a customer service, second person 211 can add new persons or update existing persons associated with the payment account held by the second person 211. For each person associated with the account, the second person can provide information for that person, such as name, mobile device information, card identification, and contact information, etc. For example, the father in a family may be the second person and may be a primary account holder of an account associated with a payment card. The father may then enroll the mother and his teenage son in the service. Either the mother or the son may be a second person. The father may provide the mother and teenage son's mobile phone numbers during the enrollment process. As will be described in further detail below, the alert system 100 then uses this data along with transaction data to generate and deliver the contact alert messages. The second person 211 may access the Web site or contact the issuer 160 to change his information at any time.

Figure 3:
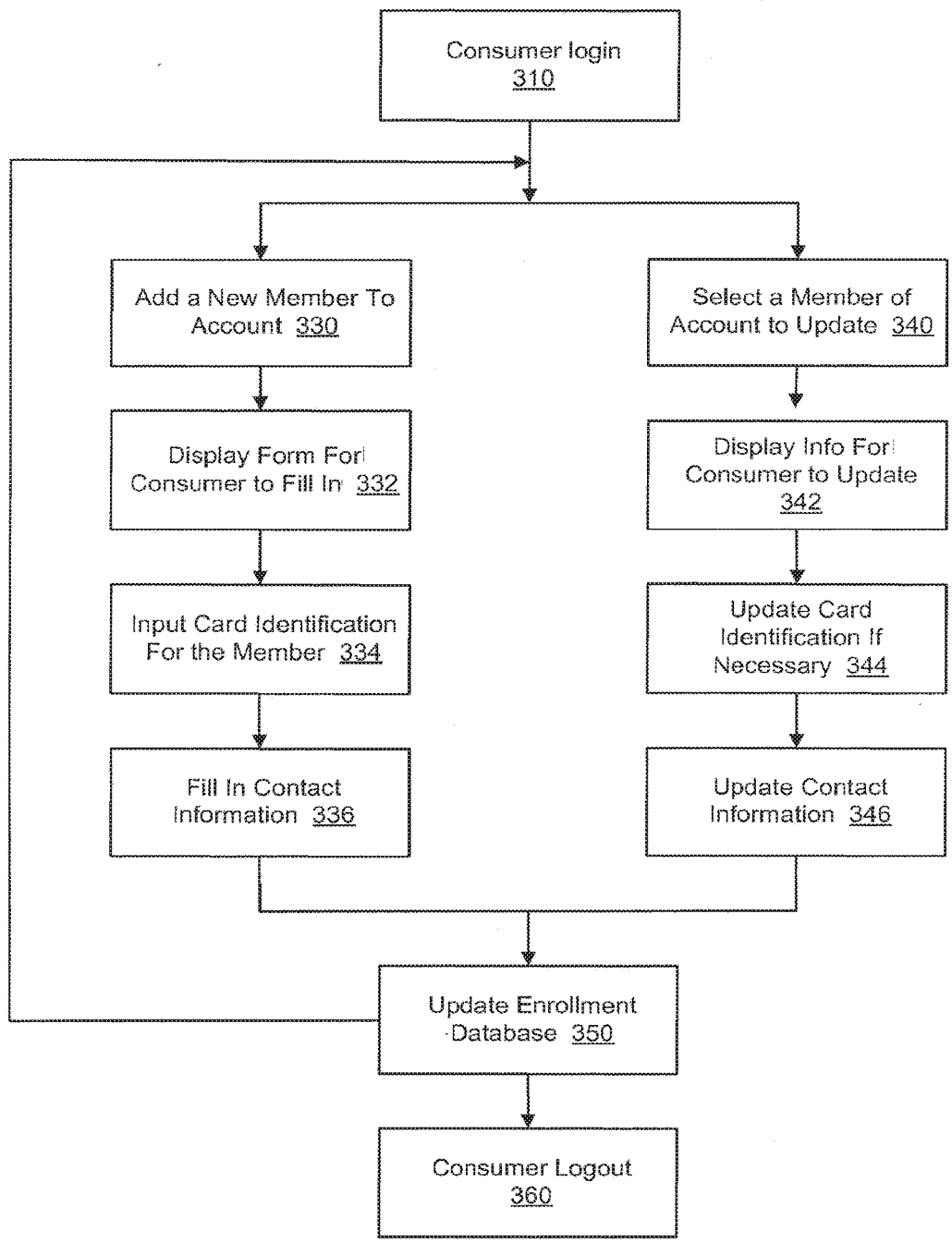
FIG. 3 shows a flowchart illustrating the steps involved in enrolling and updating a consumer in the enrollment database.

FIG. 3 illustrates an exemplary process where second person 211 creates and/or updates his user profile through enrollment process. Second person 211 first needs to log into the enrollment system by providing his login ID and password (step 310). After second person 211 inputs his login ID and password, the login ID and password are then validated against the data in the database. If the second person's login information is validated, he may either add or update a person associated with the account.

In certain embodiments of the invention, the second person may have multiple persons on the account. Each person associated with the account has a portable consumer device 120. The portable consumer device 120 contains the account number and a device identifier associated with that account number. In one embodiment, the second person 211 may add a new person (such as first person 110) to his account (step 330). An empty form can be displayed on the Web site for the second person 211 to fill in the information for the new person (step 332). In one embodiment of the invention, the fields for the second person 211 to fill in include the name of the person, the portable consumer device's identifier (step 334), and information regarding the second person's mobile device 200, such as the make and model number of the mobile device 200, and the entity that is the carrier for wireless service of that mobile device 200. Second person 211 then fills in the forms with the appropriate information (step 336), and submits the change for the enrollment system to update the database with the information that the second person 211 provided (step 350).

In one embodiment, second person 211 may update an existing person of his account (step 340). The enrollment system sends a query to the database to retrieve the information for that person. A form prefilled with the those information will be displayed on the Website for the second person 211 to update the information (step 342). Second person 211 then updates information, such as the identifier of the portable consumer device for the first person (step 344), and contact information (such as phone number of the mobile device) (step 346), and submits the change for the enrollment system to update the database with the information the consumer provided (step 350).

In one embodiment, the second person 211 may also set some other alert preferences, such as the language preference and preferred delivery channels of the contact alert message. For example, second person 211 may specify during the enrollment process that he would like to receive the contact alert messages in a particular language. Second person 211 may also specify who would receive the contact alert message when a person is conducting a transaction. In one embodiment, consumer may select one or more persons to receive the contact alert message. Second person 211 may also specify whether the alert message will be sent to a person on his mobile device 200, or at a particular e-mail address.

The information that the consumer 110 provides is stored in the database 173 in the form of consumer enrollment data 176, as shown in FIG. 2. The data, sometimes referred to as alert preference data, in addition to the transaction data 174 and issuer data 175, is used by the notification server computer 171 to generate the contact and general transaction alert messages.

B. Conducting a Transaction

Figure 4:
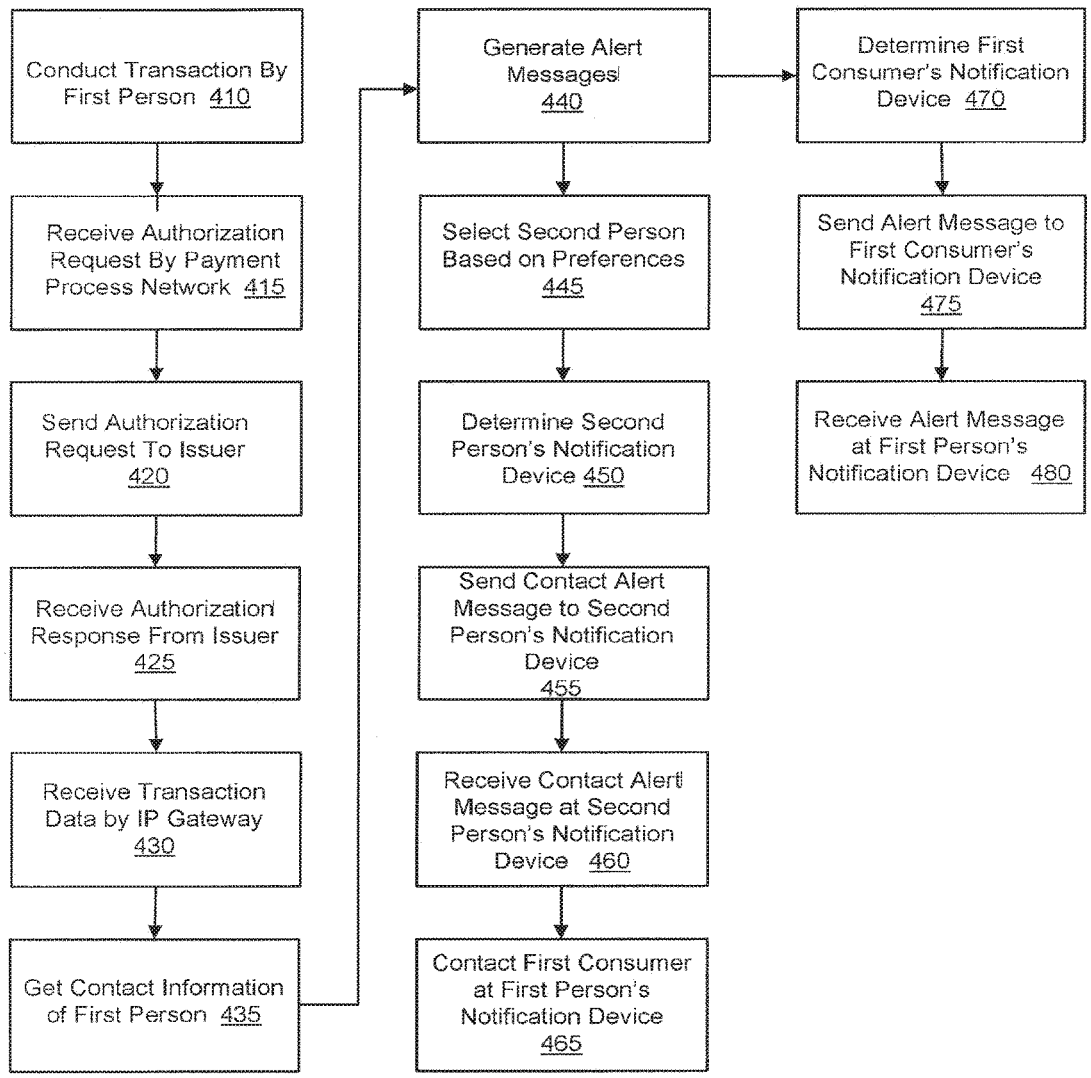
FIG. 4 shows a flowchart illustrating the steps involved when a consumer conducts a transaction.

FIG. 4 shows a flow diagram of steps involved after conducting a transaction according to an embodiment of the invention. In a typical purchase transaction, a first person 110 purchases goods or services at merchant 130 using the portable consumer device 120 (arrow 1 in FIG. 1, step 410). An authorization request message comprising transaction data is generated by a processor in the access device 132 after the portable consumer device 120 interacts with the access device 132. The authorization request message may comprise, for example, the BIN (bank identification number) and expiration date associated with the portable consumer device 120, the purchase amount, and a merchant code such as a merchant category code (MCC). The authorization request message is then forwarded from the merchant 130 to the acquirer 140 (arrow 2 in FIG. 1). After receiving the authorization request message, acquirer 140 then sends the authorization request message to the payment processing network 150 (arrow 3 in FIG. 1, step 415).

The payment processing network 150 then forwards the authorization request message to the issuer 160 (arrow 4 in FIG. 1, step 420). After the issuer 160 receives the authorization request message, the issuer 160 sends an authorization response message back to the payment processing network 150 to indicate whether or not the current transaction is authorized (or not authorized) (arrow 5 in FIG. 1).

After the payment processing network 150 receives the authorization response message (step 425), it then forwards the authorization response message to the acquirer 140 (arrow 6 in FIG. 1). The acquirer 140 then sends the authorization response message to merchant 130 (arrow 7 in FIG. 1), and it is then presented to the first person 110 (arrow 8 in FIG. 1).

If the account for the first person 110 and the second person 211 is enrolled in the contact alert messaging service, payment processing network 150 sends the transaction data to IP gateway 170 (arrow 6*b* in FIG. 1). In order for payment processing network 150 to determine whether the transaction is associated with a portable consumer device 120 that is enrolled in the contact alert messaging service, payment processing network 150 maintains a list of account numbers associated with consumers who are enrolled in the contact alert messaging service in the enrollment database 152. The data in the enrollment database 152 are synchronized with the appropriate portion(s) of the consumer enrollment data 176 via synchronization link 156 which may be in any suitable form. For example, the synchronization link 156 may be in the form of local area network connection or Internet.

After IP gateway 170 receives the transaction data 174 from payment processing network 150 (step 430), the notification server computer 171 begins the process of generating a contact alert message for that transaction. During this process, regular processing for transaction authorization continues as normal with the issuer, while at the same time the transaction is inspected and compared to pre-established selected triggers and preferences. The contact alert message is generated and is delivered in real time or near real time to the notification device operated by the second person 211. Many times, the contact alert message is received before the first person 110 leaves a checkout counter at the merchant 130 (e.g., within 5 minutes after the transaction starts).

The transaction data 174 received from the payment processing network 150 contains information such as an account number and an identifier associated with the portable consumer device 120, name of the merchant 130, a merchant identifier such as a merchant category code or MCC, a transaction identifier and the amount of the transaction. The transaction data 174 may also contain other information such as the location of the merchant 130. In one embodiment, the transaction data 174 may be stored in database 173. In other embodiments, the transaction data 174 may be sent directly to the notification server computer 171.

After receiving the transaction data 174, the notification server computer 171 analyzes the transaction data. Certain data elements in the transaction data 174 are extracted, such as the account number associated with the portable consumer device 120, the portable consumer device identifier and merchant identifier. The notification server computer 171 then accesses database 173 to retrieve alert preference data based on values of these data elements. At step 435, the notification server computer 171 accesses consumer enrollment data 176 in database 173 to retrieve the contact information of the second person 211 based on the account number and the identifier of the portable consumer device 120.

In some embodiments, the notification server computer 171 may also retrieve the issuer data. The issuer data may include, the name and address of the issuer, a phone number to contact, and the issuer's logo, etc. In one embodiment, the issuer data may be stored in the database 173. In another embodiment, the issuer data may reside in a remote database. In still another embodiment, the issuer data may be sent to the IP gateway 170 by the payment processing network 150. The issuer data may be used in generating an alert message.

The notification server computer 171 may also access other resources to further enhance the contact alert messages. These resources may be in the form of translation tables or reference tables for abbreviations and symbols. Such resources may be part of the database 173, be stored in notification server computer 171, or be stored in a remote location. In some embodiments, the contact alert messages are translated into a language spoken by the consumer 110. During the enrollment process, the consumer 110 may be provided with the option of receiving the contact alert messages in his native language.

After accessing the alert preference data and determining the technical requirements and consumer and merchant preferences, the notification server computer 171 generates a contact alert message and a general alert message (step 440). The alert message generation is performed by a processor using a software application stored in the computer readable medium 172 that is running on the notification server computer 171. In one embodiment, some functions may be performed by an Application Specific Integrated Circuit (ASIC) that may be part of the notification server computer 171. In some other embodiments, the contact alert messages may be generated by the combination of software applications and ASICs.

Figure 5:
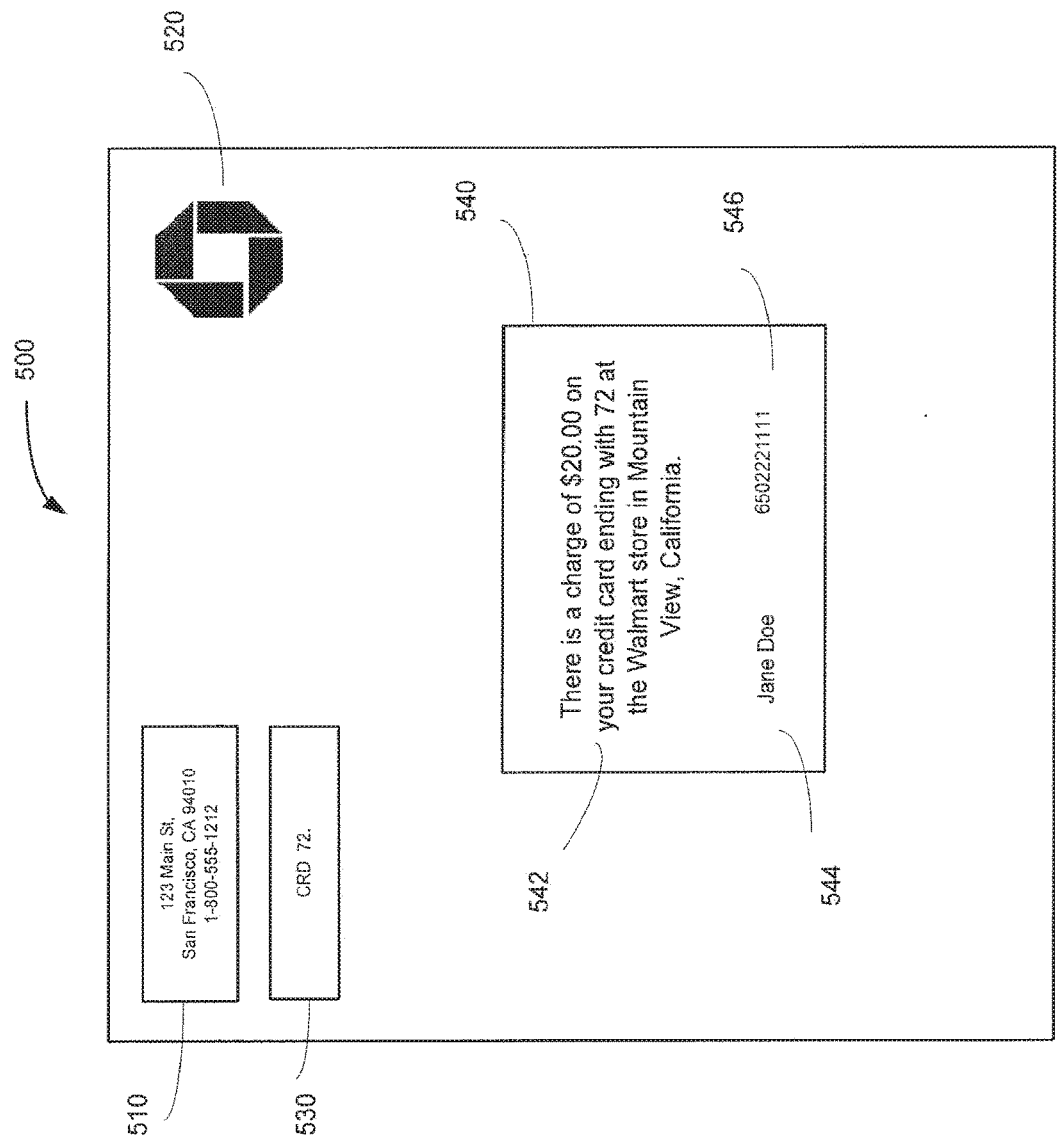
FIG. 5 illustrates a schematic illustration of a contact alert message according to an embodiment of the invention.

FIG. 5 shows an exemplary contact alert message 500 sent to the second person 211. In certain embodiments of the invention, the contact alert message 500 provides the alert sender information 510 so that the recipient of the message can identify the sender of the alert message. For example, the alert message 500 may contain the name and address of the sender. The contact alert message may also contain the phone number of the sender so that the second person may contact the sender. In certain embodiments, a contact alert message 500 may include a logo 520 of the sender, further identifying the sender.

The contact alert message 500 may also include account information 530 to identify the account involved in the transaction. The account information on the alert message may clearly identify the account associated with the transaction. In one embodiment, the account information on the alert does not include the full and complete account number in order to protect the information if the alert message ever gets lost. For example, an alert message may use a phrase "CRD 72" to identify a credit card account which ends in 72.

In certain embodiments, the main body 540 of a contact alert message 500 comprises text. The text could include any information regarding the associated transaction. For example, the text may be: "There is a charge of $20.00 on your credit card ending with 72 at the Walmart™ store in Mountain View, Calif." Various tables of different specific messages or message templates may be used to generate a contact alert message. For example, a message template indicating a grocery store might be "You purchased $[insert purchased amount] of groceries at $[insert store name] in $[insert store location]."

In certain embodiments of the invention, the contact alert message 500 contains the name of the first person who conducted the transaction 544, and/or the contact information of the first person 546. The contact information may be in the form of a phone number or other address (e-mail address), which is immediately selectable by the second person. When the second person selects the contact information, the device that is displaying the contact information may automatically call the first person that is associated with the contact information and that is conducting the present transaction.

In some embodiments, the notification server computer 171 may also generate a general alert message to send to the first person 110 who conducted the transaction. Unlike the contact alert message that is sent to the second person, the general alert message does not include the name and contact information of the first person. Other attributes of the general alert message may be similar to those shown in FIG. 5. Thus, in embodiments of the invention, at least two alert messages with different content may be sent to two different persons.

In situations where the notification server computer 171 generates alert messages for a transaction based on the preference of more than one delivery channels, each message may be customized based on criteria and requirements of each of the delivery channels. For example, if one contact alert message is being sent to the mobile device 200 in the form of a text message, and another one to the user computer 210 in the form of an e-mail, the notification server computer 171 may include more graphics and data in the e-mail message. In some embodiments, issuer 160 may have different logo formats for use with different delivery channels.

When an alert message is generated by the notification server computer 171, it is sent to the delivery channel logic 182 for delivery to consumer 110 (arrows 6b in FIG. 1). The delivery channel logic 182 may be in the form of one or more software applications running on one or more computers that are tasked with delivery of the contact alert messages to the appropriate delivery channel. In one embodiment, the delivery channel logic may be part of the IP gateway 170. In another embodiment, the delivery channel logic 182 may be a third party entity that receives the contact alert message via network connection 154 and sends it to an appropriate user device.

In one embodiment, the alert messages may be sent along with an indicator that specifies what form of delivery channel should be used for the delivery of the message. The notification server computer 171 retrieves the indicator from enrollment database. Delivery channel logic 182 is in communication with mobile device carriers 190 and e-mail servers 180, for sending the contact alert messages in formats that are readable by the mobile device 200, and in the form of e-mail messages that are readable by user computer 210.

In one embodiment, the notification server computer 171 retrieves the information of the second person 211 that is supposed to receive the contact alert message, from the enrollment database (step 445). This information includes name of the second person and mobile device 200 information of the second person (step 450). The notification server computer then sends the contact alert message to the second person's mobile device 200 (step 455).

In another embodiment, the notification server computer 171 retrieves the mobile device information of the first person so that a general alert message can be sent to him (step 470). The notification server computer 171 then sends the general alert message to the first person's mobile device 200 (step 475). In some embodiments, an alert message may be sent to a user in the form of Interactive Voice Response (IVR), Instant Message (IM), voicemail, etc.

In some embodiments, the delivery channel logic 182 or the notification server computer 171 may cause the mobile device 200 to play an special audio file with a sound of a "beep" when receiving an alert message (steps 460, 480). In embodiments where the second person receives a contact alert message regarding a transaction conducted by the first person, once the second person is alerted of the transaction, the second person may contact the first person using the contact information provided in the contact alert message.

III. Portable Consumer Devices and Computer Apparatuses

Figure 6:
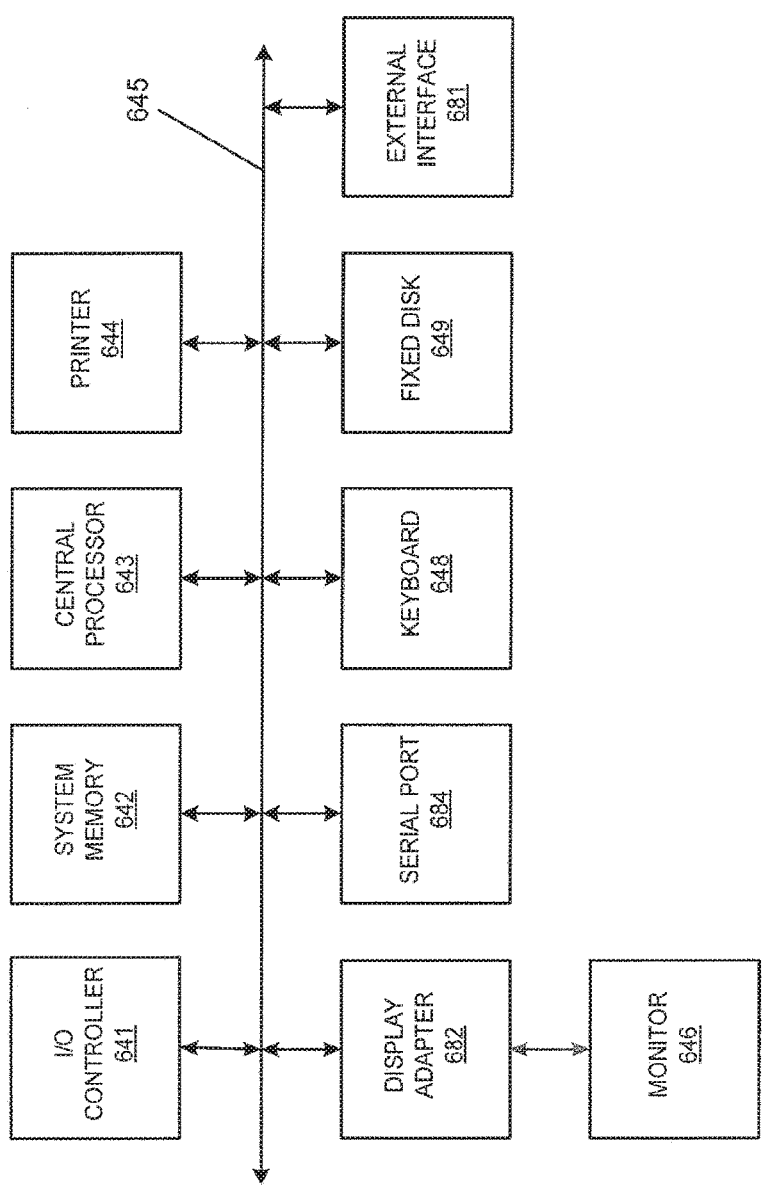
FIG. 6 shows a high-level block diagram of a computer apparatus.

The various participants and elements in FIGS. 1 and 2 may operate one or more computer apparatuses to facilitate the functions described herein. Any of the elements in FIGS. 1 and 2 may use any suitable number of subsystems to facilitate the functions described herein. Examples of such subsystems or components are shown in FIG. 6. The subsystems shown in FIG. 6 are interconnected via a system bus 645. Additional subsystems such as printer 644, keyboard 648, fixed disk 649, monitor 646, which is coupled to display adapter 682, and others are shown. Peripherals and input/output (I/O) devices, which couple to I/O controller 641, can be connected to the computer system by any number of means known in the art, such as serial port 684. For example, serial port 684 or external interface 681 can be used to connect the computer apparatus to a wide area network such as the Internet, a mouse input device, or a scanner. The interconnection via system bus 645 allows a central processor 643 to communicate with each subsystem and to control the execution of instructions from system memory 642 or fixed disk 649, as well as the exchange of information between subsystems. The system memory 642 and/or fixed disk 649 may embody a computer readable medium.

Figure 7A:
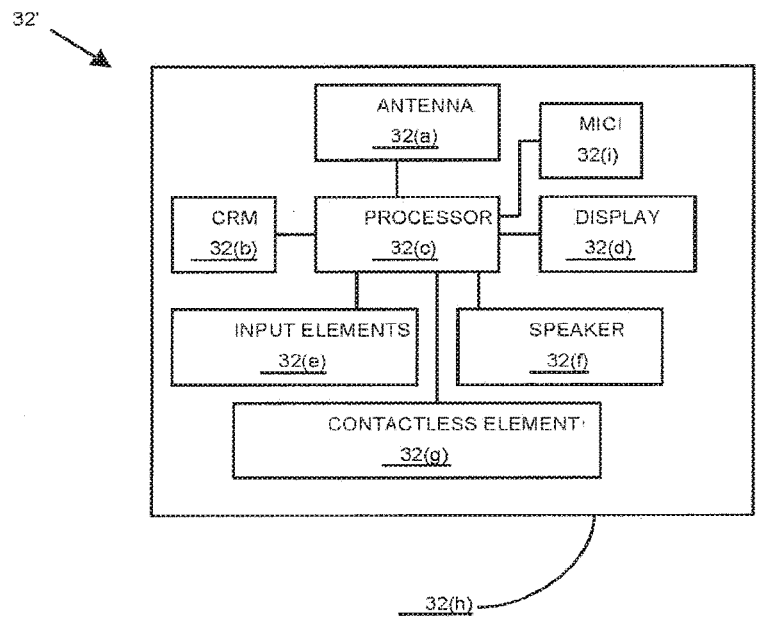
FIG. 7A shows a block diagram of a phone.
Figure 7B:
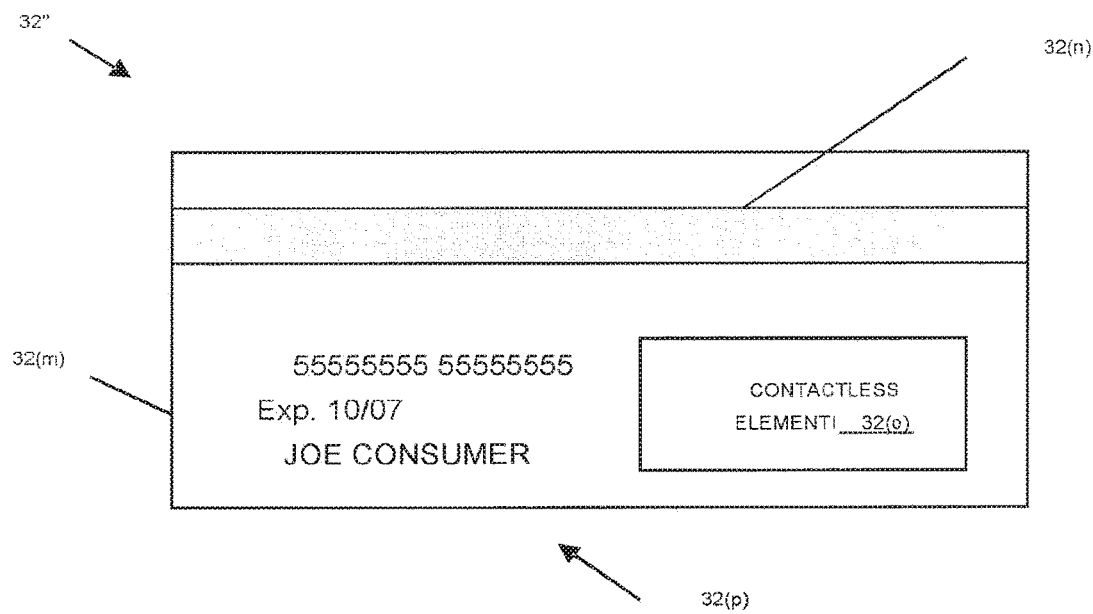
FIG. 7B shows a diagram of a portable consumer device in the form of a payment card.

FIGS. 7A-7B show block diagrams of portable computer devices and subsystems that may be present in computer apparatuses in systems according to embodiments of the invention.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones (e.g., the phone 34 described above), personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 32' in the form of a phone may comprise a computer readable medium and a body as shown in FIG. 7A. (FIG. 7A shows a number of components, and the portable consumer devices according to embodiments of the invention may comprise any suitable combination or subset of such components.) The computer readable medium 32(*b*) may be present within the body 32(*h*), or may be detachable from it. The body 32(*h*) may be in the form a plastic substrate, housing, or other structure. The computer readable medium 32(*b*) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) portable consumer device 32' and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(*c*) (e.g., a microprocessor) for processing the functions of the portable consumer device 32' and a display 32(*d*) to allow a consumer to see phone numbers and other information and messages. The portable consumer device 32' may further include input elements 32(*e*) to allow a consumer to input information into the device, a speaker 32(*f*) to allow the consumer to hear voice communication, music, etc., and a microphone 32(*i*) to allow the consumer to transmit her voice through the portable consumer device 32. The portable consumer device 32' may also include an antenna 32(*a*) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 32" in the form of a card is shown in FIG. 7B. FIG. 7B shows a plastic substrate 32(*m*). A contactless element 32(*o*) for interfacing with an access device 34 may be present on or embedded within the plastic substrate 32(*m*). Consumer information 32(*p*) such as an account number, expiration date, and consumer name may be printed or embossed on the card. Also, a magnetic stripe 32(n) may also be on the plastic substrate 32(m).

As shown in FIG. 7B, the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

Embodiments of the invention have a number of advantages. For example, embodiments of the invention can alert a second person of a transaction that a first person is conducting using a contact alert message. One of the benefits of receiving alert messages of transactions conducted by a first person, by the second person, is that the second person is made aware of where the first person is at any given moment. If the second person is made of aware of where the first person is and what the first person is purchasing, then the second person can easily contact the first person shortly after the first person has conducted a transaction. The second person can ask the first person where he or she is, why they are conducting the current purchase, what is being purchased, if additional purchases can be made, if other errands close to the merchant can be run, etc. Thus, embodiments of the invention allow different persons using the same payment account to easily communicate with each other, substantially contemporaneously with a transaction being conducted.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:

receiving, by a transaction processing server computer, a transaction authorization request message from an access device after the access device interacts with a portable consumer device in possession of a first person, wherein the transaction authorization request message requests authorization for a transaction conducted using a payment account associated with the portable consumer device;

transmitting, by the transaction processing server computer, transaction data for the transaction to a notification server computer upon determining that the payment account is enrolled in an alert messaging service;

transmitting, by the transaction processing server computer, the transaction authorization request message to an issuer of the payment account to process the transaction;

while the issuer processes the transaction to determine whether the transaction is authorized:

retrieving, by the notification server computer, alert preference data associated with the payment account from an alert database storing the alert preference data;

determining, by the notification server computer, that a contact alert message is requested by comparing the transaction data to alert preference data associated with the payment account;

determining, by a delivery channel logic of the notification server computer, a communication channel and contact information for a second notification device operated by a holder of the payment account identified in the alert preference data associated with the payment account for transmitting the contact alert message;

determining, by the delivery channel logic of the notification server computer, a content and a format of the contact alert message based on the communication channel such that a first contact alert message prepared for a first communication channel has a different content and format than a second contact alert message prepared for a second communication channel;

generating, by the notification server computer, the contact alert message using the transaction data and the alert preference data based on the determined content and format, wherein the contact alert message comprises contact information of a first notification device used by the first person conducting the transaction;

sending, by the delivery channel logic of the notification server computer, the contact alert message comprising the contact information of the first notification device used by the first person to the second notification device used by the holder of the payment account, wherein the contact information of the first notification device used by the first person is in the form of an active link on the second notification device, such that, when selected, automatically contacts the first notification device used by the first person, wherein the contact information comprises a phone number or an email address;

generating, by the notification server computer, a general alert message in addition to the contact alert message; and sending the general alert message to the first notification device used by the first person.

2. The method of claim 1, further comprising:
accessing, by the transaction processing server computer, an enrollment database storing information associated with the payment account to determine that the payment account is enrolled in the alert messaging service.

3. The method of claim 2, further comprising:
retrieving, by the notification server computer, contact information for the holder of the payment account from a contact information database storing the contact information,
wherein the second notification device used by the holder of the payment account is accessible using the contact information of the holder of the payment account,
wherein data stored at the contact information database is synchronized with data stored at the enrollment database.

4. The method of claim 1 wherein the alert preference data comprises one or more user profiles.

5. The method of claim 1 wherein the first notification device is a mobile phone, and wherein the method further comprises:
activing the active link on the second notification device; and
automatically contacting the first notification device by the second notification device in response to activating the active link.

6. The method of claim 1 wherein the transaction processing server computer and the notification server computer are operated by a same entity.

7. The method of claim 1 wherein the contact information is translated into a language that is understood by the holder of the payment account.

8. The method of claim 1 wherein the first person conducting the transaction is different from the holder of the payment account.

9. A contact alert system comprising:
an alert database comprising alert preference data;
a notification server computer coupled to the alert database, the notification server computer comprising a first processor and a first computer-readable medium coupled to the first processor; and
a transaction processing computer coupled to the notification server computer, the transaction processing computer comprising a second processor and a second computer-readable medium coupled to the second processor, the second computer-readable medium comprising instructions that, when executed by the second processor, cause the second processor to:
receive a transaction authorization request message from an access device after the access device interacts with a portable consumer device in possession of a first person, wherein the transaction authorization request message requests authorization for a transaction conducted using a payment account associated with the portable consumer device;
transmit transaction data for the transaction to the notification server computer upon determining that the payment account is enrolled in an alert messaging service;
transmit the transaction authorization request message to an issuer of the payment account to process the transaction;
while the issuer processes the transaction to determine whether the transaction is authorized, the first computer-readable medium comprising instructions that, when executed by the first processor, cause the first processor to:
retrieve alert preference data associated with the payment account from the alert database storing the alert preference data;
determine that a contact alert message is requested by comparing the transaction data to alert preference data associated with the payment account;
determine a communication channel and contact information for a second notification device operated by a holder of the payment account identified in the alert preference data associated with the payment account for transmitting the contact alert message;
determine a content and a format of the contact alert message based on the communication channel such that a first contact alert message prepared for a first communication channel has a different content and format than a second contact alert message prepared for a second communication channel;
generate the contact alert message using the transaction data and the alert preference data based on the determined content and format, wherein the contact alert message comprises contact information of a first notification device used by the first person conducting the transaction;
send the contact alert message comprising the contact information of the first notification device used by the first person to the second notification device used by the holder of the payment account, wherein the contact information of the first notification device used by the first person is in the form of an active link on the second notification device, such that, when selected, automatically contacts the first notification device used by the first person,
wherein the contact information comprises a phone number or an email address;
generate a general alert message in addition to the contact alert message; and
send the general alert message to the first notification device used by the first person.

10. The contact alert system of claim 9, further comprising:
an enrollment database storing information associated with the payment account,
wherein the second computer-readable medium further comprising instructions that, when executed by the second processor, cause the second processor to:
access the enrollment database storing information associated with the payment account to determine that the payment account is enrolled in the alert messaging service.

11. The contact alert system of claim 10, wherein the first computer-readable medium further comprises instructions that, when executed by the first processor, cause the first processor to:
retrieve contact information for the holder of the payment account from a contact information database storing the contact information,
wherein the second notification device used by the holder of the payment account is accessible using the contact information of the holder of the payment account,
wherein data stored at the contact information database is synchronized with data stored at the enrollment database.

12. The contact alert system of claim 9 wherein the alert preference data comprises one or more user profiles.

13. The contact alert system of claim 9 wherein when the active link on the second notification device is activated, the first notification device is automatically contacted by the second notification device in response to activating the active link.

14. The contact alert system of claim 9 wherein the transaction processing server computer and the notification server computer are operated by a same entity.

15. The contact alert system of claim 9 wherein the contact information is translated into a language that is understood by the holder of the payment account.

16. The contact alert system of claim 9 wherein the first person conducting the transaction is different from the holder of the payment account.

* * * * *

UNITED STATES PATENT AND TRADEMARK OFFICE
CERTIFICATE OF CORRECTION

PATENT NO. : 10,163,109 B2
APPLICATION NO. : 15/463733
DATED : December 25, 2018
INVENTOR(S) : Ayman Hammad and Mark Carlson Page 1 of 1

It is certified that error appears in the above-identified patent and that said Letters Patent is hereby corrected as shown below:

In the Claims

In Column 17, Line 7 please remove "transaction processing server computer" and insert
-- transaction processing computer --

Signed and Sealed this
Second Day of April, 2019

Andrei Iancu
*Director of the United States Patent and Trademark Office*